(12) United States Patent
Ramachandran

(10) Patent No.: US 7,941,012 B2
(45) Date of Patent: May 10, 2011

(54) PHASE-ENGINEERED FIBERS FOR USE IN GENERATING CYLINDRICAL VECTOR BEAMS

(75) Inventor: Siddharth Ramachandran, Boston, MA (US)

(73) Assignee: OPS Fitel, LLC, Norcross, GA (US)

( * ) Notice: Subject to any disclaimer, the term of this patent is extended or adjusted under 35 U.S.C. 154(b) by 0 days.

(21) Appl. No.: 12/853,327

(22) Filed: Aug. 10, 2010

(65) Prior Publication Data

US 2010/0303402 A1  Dec. 2, 2010

Related U.S. Application Data

(62) Division of application No. 12/368,147, filed on Feb. 9, 2009, now Pat. No. 7,778,498.

(60) Provisional application No. 61/028,043, filed on Feb. 12, 2008.

(51) Int. Cl.
*G02B 6/00* (2006.01)

(52) U.S. Cl. .......................................... 385/11; 385/127

(58) Field of Classification Search .................. 385/127, 385/11; 398/141
See application file for complete search history.

(56) References Cited

U.S. PATENT DOCUMENTS

| | | | | |
|---|---|---|---|---|
| 5,852,701 | A * | 12/1998 | Kato et al. | 385/127 |
| 6,181,858 | B1 * | 1/2001 | Kato et al. | 385/123 |
| 7,483,612 | B2 * | 1/2009 | Digiovanni et al. | 385/123 |

\* cited by examiner

*Primary Examiner* — Charlie Peng
(74) *Attorney, Agent, or Firm* — Jacobs & Kim LLP; Daniel Kim, Esq.

(57) ABSTRACT

A phase-engineered fiber is described for generating a cylindrically polarized beam. The fiber includes a core region, a ring region surrounding the core region, and an outer cladding region surrounding the ring region. The fiber regions are configured to cause the fiber to have a refractive index step proximate to the peak amplitude value of the mode intensity profile of an $LP_{11}$ mode guided by the fiber. The refractive index step is sufficiently steep such that at least one of the cylindrically polarized $TM_{01}$ and $TE_{01}$ eigenmodes has an effective refractive index $n_{\it eff}$ that is sufficiently separated from the respective effective refractive index of the other eigenmodes to allow coupling to the at least one cylindrically polarized eigenmode with minimal coupling to the other eigenmodes.

6 Claims, 8 Drawing Sheets

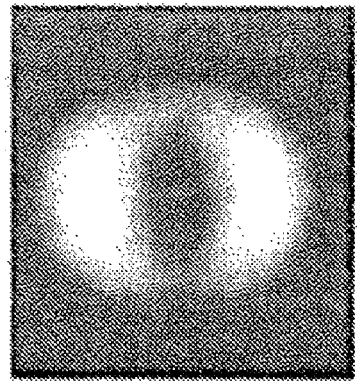
FIG. 1 LP$_{11}$ 20
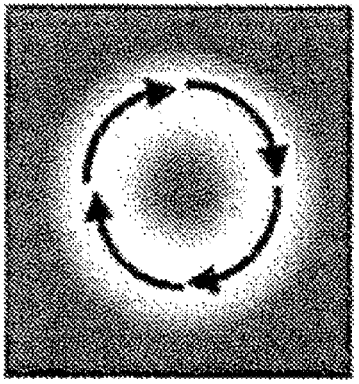
FIG. 2D TE$_{01}$ 24
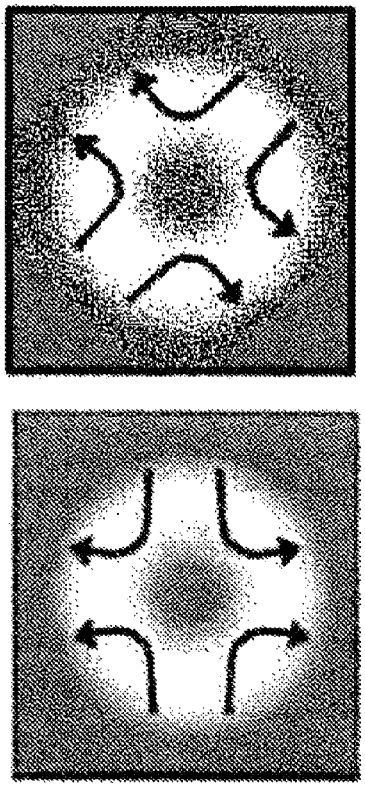
FIG. 2C HE$_{21}$ (odd) 23
FIG. 2B HE$_{21}$ (even) 22
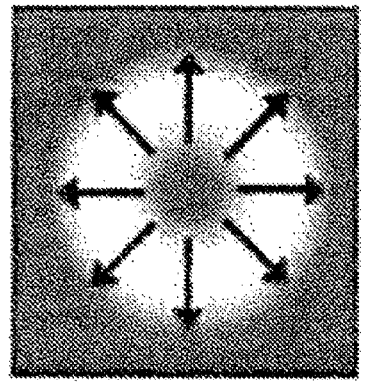
FIG. 2A TM$_{01}$ 21

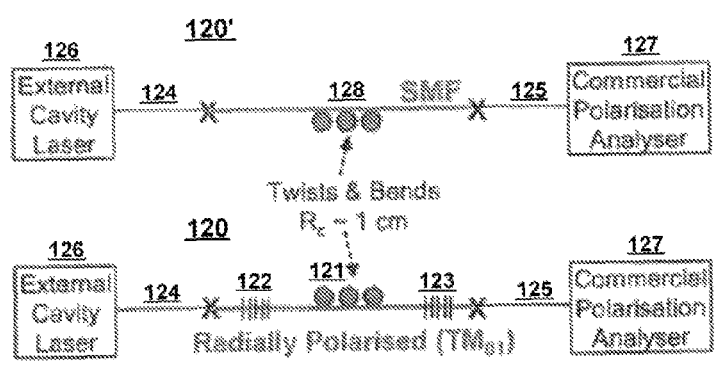 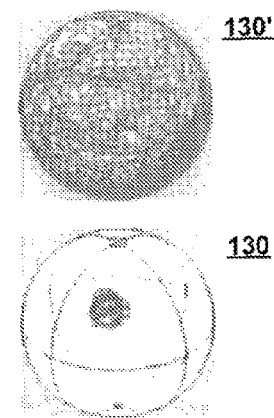
FIG. 12                    FIG. 13

US 7,941,012 B2

PHASE-ENGINEERED FIBERS FOR USE IN GENERATING CYLINDRICAL VECTOR BEAMS

CROSS REFERENCE TO RELATED APPLICATIONS

The present application is a divisional of co-pending U.S. patent application Ser. No. 12/368,147, filed on Feb. 9, 2009.

U.S. patent application Ser. No. 12/368,147 claims the priority benefit of U.S. Provisional Patent Application Ser. No. 61/028,043, filed on Feb. 12, 2008.

The above applications are incorporated herein by reference in their entirety.

BACKGROUND OF THE INVENTION

1. Field of the Invention

The present invention relates generally to optical fiber devices and methods, and in particular to improved techniques for generating cylindrical vector beams.

2. Description of Prior Art

A cylindrical vector beam is a polarized beam having a polarization state with rotational symmetry about the axis of the beam, and includes radially polarized beams and azimuthally polarized beams. Radially polarized beams in particular have recently attracted a significant amount of interest because of their unique properties. The longitudinal electric-field component generated when a radially polarized beam is focused with a high-numerical-aperture systems results in high intensities with a zero Poynting vector along the optical axis. This property enables longitudinal-field spot-sizes smaller than allowed by the diffraction limit, enhanced laser machining, efficient optical tweezers, and tailoring atomic dipole states for quantum information.

Current approaches for generating radially polarized beams using free-space resonators or fibers are fraught with instability problems. One issue that must be overcome in a fiber-based approach is that, within an optical fiber, radially polarized beams co-exist in with three other almost degenerate modes that share the same mode intensity profile but have different polarization-vector orientations. Inadvertent coupling between these modes produces the more familiar, rotationally unstable, first higher-order antisymmetric $LP_{11}$ mode pattern, rather than the desired radially polarized mode.

The rotationally unstable $LP_{11}$ mode resulting from the coupling of the four almost degenerate eigenmodes in a multimode fiber is akin to a typical single-mode fiber (SMF), in which the conventional $LP_{01}$ mode is two-fold degenerate with identical intensity patterns but different polarization orientations. Slight perturbations result in a coupling of these polarizations, thereby rendering polarization-maintaining (PM) operation impossible in an SMF.

The $LP_{11}$ field pattern not only rotates for even the slightest perturbations in the fiber, its polarization vector also changes orientation. Indeed, previous efforts at generating radially polarized modes with fibers have achieved it either in very short, straight segments, and/or with low modal purity in cavities similar to those employed with bulk laser rods.

SUMMARY OF THE INVENTION

These and other issues of the prior art are addressed by the present invention, one aspect of which provides a phase-engineered fiber for generating a cylindrically polarized beam, e.g., a radially polarized beam or an azimuthally polarized beam.

The fiber includes a core region having a radius $r_{core}$, a refractive index $n_{core}$, and an effective refractive index $\Delta n_{core}$ with respect to an outer cladding region having an outer radius $r_{cladding}$ and a refractive index $n_{cladding}$, where $\Delta n_{core} = n_{core} - n_{cladding}$; and a ring region surrounding the core region, the ring region having an inner radius equal to $r_{core}$ and an outer radius $r_{ring}$, a refractive index $n_{ring}$ greater than $n_{cladding}$, and a positive effective refractive index $\Delta n_{ring} = n_{ring} - n_{cladding}$.

The values of $r_{cladding}$, $r_{core}$, $r_{ring}$, $\Delta n_{core}$, and $\Delta n_{ring}$ cause the fiber to have a refractive index step proximate to the peak amplitude value of the mode intensity profile of an LP, mode guided by the fiber. The higher-order $LP_{11}$ mode comprises a linear combination of eigenmodes, including the cylindrically polarized $TM_{01}$ and $TE_{01}$ eigenmodes, and the mixed $HE_{21\ (even)}$ and $HE_{21\ (odd)}$ eigenmodes.

The refractive index step is sufficiently steep such that at least one of the cylindrically polarized $TM_{01}$ and $TE_{01}$ eigenmodes has an effective refractive index $n_{eff}$ that is sufficiently separated from the respective effective refractive index of the other eigenmodes to allow coupling to the at least one cylindrically polarized eigenmode with minimal coupling to the other eigenmodes.

Additional features and advantages of the present invention will become apparent by reference to the following detailed description and accompanying drawings.

BRIEF DESCRIPTION OF THE DRAWINGS

FIG. 1 is a modefield image of the first higher-order $LP_{11}$ mode.

FIGS. 2A-D are a series of modefield images of the four almost degenerate eigenmodes for the $LP_{11}$ mode.

FIG. 12 is a diagram of a setup for testing the polarization characteristics of a phase-engineered fiber according to the invention, in which the fiber is perturbed by a series of twists and bends.

FIG. 13 are a pair of Poincaré spheres generated from the FIG. 12 testing setup.

DETAILED DESCRIPTION

Figure 3:
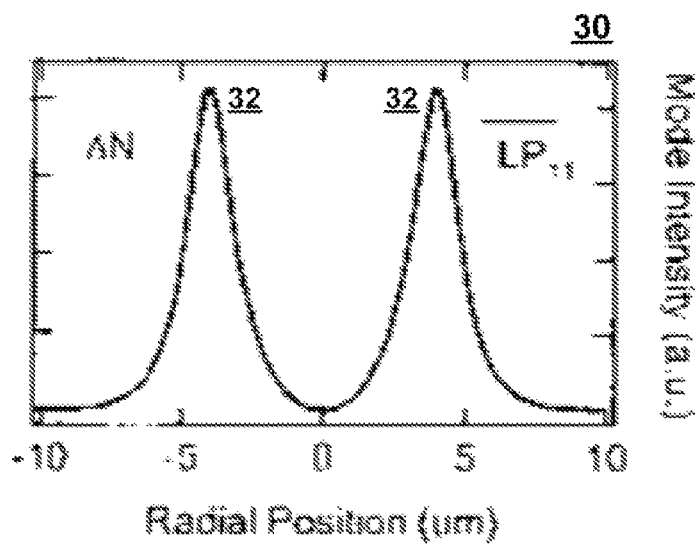
FIG. 3 is a mode intensity profile for the scalar $LP_{11}$ mode.

The above issues and others are addressed by the present invention, aspects of which are directed to in-fiber systems and methods for generating cylindrically polarized beams, e.g., radially polarized beams and azimuthally polarized beams. These radially polarized beams, which are attractive for many scientific and technological applications, are generated as stable eigenmodes in an optical fiber. The described techniques yield a new class of fibers that are polarization-maintaining even though they are strictly cylindrically symmetric.

An aspect of the invention provides a new phase-engineered fiber that lifts the polarization degeneracy of the antisymmetric $LP_{11}$ mode so that the propagation constants of its vector components are separated by a large magnitude. The described fiber provides stable guidance for both the fundamental, Gaussian-shaped $LP_{01}$ mode, as well as the radially polarized $TM_{01}$ mode.

The significantly increased separation of propagation constants allows fiber-grating-based excitation of a single desired mode, e.g., the radially polarized $TM_{01}$ mode, with exceptional modal purity, i.e., 99.6% or greater, when the input is a conventional Gaussian beam. Further, it will be appreciated that the techniques described herein have general application, and can be used to create a fiber device that can receive a Gaussian input from any source, including but not limited to high-power lasers, broadband sources, and the like, and convert the Gaussian input into a radially or azimuthally polarized beam output.

While group delay or dispersion engineering in fibers is well known, there are few demonstrations of altering the phase itself. One example in this regard is a polarization-maintaining (PM) fiber, in which the fiber is made sufficiently elliptical, in index or geometry, so that the difference in the effective refractive index $n_{eff}$ between the fundamental eigenmodes with orthogonal polarizations is greater than $1\times10^{-4}$.

Thus, the presently described techniques provide a new class of PMF that provides a large separation in propagation constants for cylindrical vector modes. It should further be noted that the design does not require geometric or index ovalities. The described techniques provide the first PMF that is cylindrically symmetric.

The development of a cylindrically symmetric PMF has several ramifications, including the following: (a) high-power PMF lasers and amplifiers are feasible since, radially, the described modes can achieve large mode areas; (b) no special PMF splicers are needed; further, because it is no longer necessary to align the PMF fiber prior to splicing, polarization extinction ratios (PERs) could potentially be improved; and (c) cylindrically symmetric PMFs may have lower manufacturing costs compared with other types of PMFs.

FIG. 1 shows the modefield intensity pattern 20 for the first higher-order mode $LP_{11}$ in a conventional fiber. As mentioned above, the $LP_{11}$ mode is antisymmetric and rotationally unstable. The $LP_{11}$ mode is actually a linear combination of four almost degenerate cylindrical vector eigenmodes. FIGS. 2A-D are a series of images illustrating the respective modefield intensity patterns for each of these eigenmodes. Further shown in FIGS. 2A-D are vector representations of the modes, indicated by arrows.

FIG. 2A shows the modefield intensity pattern and vector representation 21 for the radially polarized $TM_{01}$ eigenmode.

FIGS. 2B and 2C show, respectively, the modefield intensity pattern and vector representation 22 and 23 for the mixed $HE_{21\ (even)}$ and $HE_{21\ (odd)}$ eigenmodes.

FIG. 2D shows the modefield intensity pattern and vector representation 24 for the azimuthally polarized $TE_{01}$ eigenmode.

It will be seen that, when viewed in isolation, the $TM_{01}$ eigenmode illustrated in FIG. 2A provides a radially polarized beam, and the $TE_{01}$ eigenmode provides an azimuthally polarized beam. However, these eigenmodes are obscured by cross-coupling with the other eigenmodes. Further, in a typical multimode fiber, the four illustrated eigenmodes have propagation constants that, while different, are extremely close to each other. Thus, conventional techniques cannot be used to extract either the $TM_{01}$ or the $TE_{01}$ eigenmode from the other eigenmodes.

An aspect of the invention provides a new polarization-maintaining fiber (PMF) that vastly increases the difference between the propagation constants of the cylindrically polarized $TM_{01}$ and $TE_{01}$ eigenmodes and that of the mixed $HE_{21\ (even)}$ and $HE_{21\ (odd)}$ eigenmodes. With a significantly distinct propagation constant, it is possible to couple to a desired cylindrically polarized eigenmode with high modal purity. Further, the new PMF is cylindrically symmetric, which is advantageous for various reasons set forth above.

The new PMF design is based on first-order perturbative analysis, which shows that vector corrections to the propagation constants become large when scalar mode intensities are high at index steps. The four almost degenerate eigenmodes have identical electric-field amplitudes and differ only in their electric-field orientations. Thus, their propagation constants $$\beta = \frac{2\pi n_{eff}}{\lambda}$$

are similar, except for a vector correction arising from different electric field orientations at index-steps in the fiber waveguide.

The amount of this correction for each mode can be obtained from a first-order perturbative analysis:

$$\delta\beta_{TE_{01}} = 0 \quad \text{(Eq. 1)}$$

$$\delta\beta_{TM_{01}} \propto 2(I_1 + I_2) \quad \text{(Eq. 2)}$$

$$\delta\beta_{HE_{21}(even\ and\ odd)} \propto (I_1 - I_2) \quad \text{(Eq. 3)}$$

where $$I_1 = \int r \cdot E(r) \cdot \frac{\partial E(r)}{\partial r} \cdot \frac{\partial F(r)}{\partial r} dr \quad \text{(Eq. 4)}$$

and $$I_2 = \int E^2(r) \cdot \frac{\partial F(r)}{\partial r} dr \quad \text{(Eq. 5)}$$

where $E(r)$ is the electric-field profile for the scalar mode, and where $F(r)$ is the normalized index profile of the fiber.

From Equations 1-5, it will be appreciated that it is possible to increase the degeneracy splittings by designing a waveguide having a refractive index profile with suitable values for $I_1$ and $I_2$, i.e., a refractive index profile having a steep refractive index step $$\frac{\partial F(r)}{\partial r}$$

proximate to the peak amplitude of the $LP_{11}$ scalar field $E(r)$.

FIG. 3 shows a mode intensity profile 30 for the scalar $LP_{11}$ mode, in which mode intensity (y-axis) is plotted against radial position across the waveguide (x-axis). The "0" value on the x-axis represents the axial center of the waveguide. For purposes of illustration and comparison, mode intensity is expressed in arbitrary units. As shown in FIG. 3, in the present example, the scalar $LP_{11}$ mode has a generally M-shaped intensity profile, symmetrical around the center of the waveguide, with peaks 32 at approximately ±4 micrometers.

Figure 4:
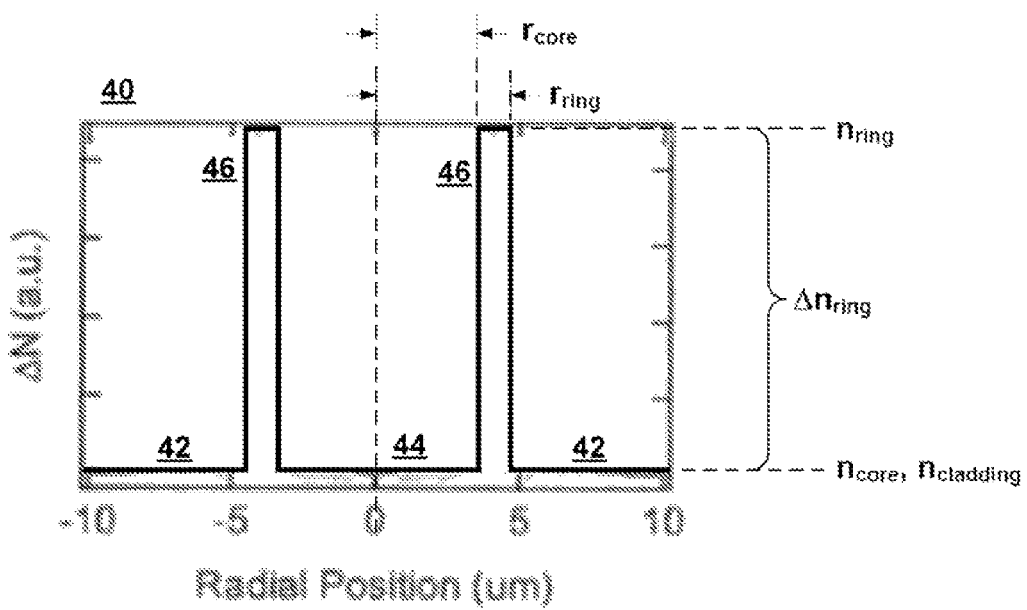
FIG. 4 is a desired refractive index profile for a phase-engineered fiber according to an aspect of the invention.

FIG. 4 shows a desired refractive index profile 40 for a phase-engineered fiber waveguide according to an aspect of the present invention. Again, for the purposes of illustration and comparison, the refractive index profile is expressed in arbitrary units. The fiber includes an outer cladding region 42 having a radius $r_{cladding}$ (FIG. 5) and a refractive index $n_{cladding}$. The cladding refractive index $n_{cladding}$ is used as a reference value in determining the effective refractive index $\Delta n$ for the other fiber regions.

The fiber includes a flat core region 44 having a radius $r_{core}$, and a refractive index $n_{core}$. The core effective refractive index $\Delta n_{core}$, is determined by subtracting from $n_{core}$, the cladding refractive index $n_{cladding}$, i.e., $\Delta n_{core} = n_{core} - n_{cladding}$. In the present example of the fiber, $\Delta n_{core}$, is equal to zero.

The core region 44 is surrounded by a ring region 46 having an inner radius equal to $r_{core}$, an outer radius $r_{ring}$, and a refractive index $n_{ring}$. As shown in FIG. 4, the ring region 46 has a relatively large effective refractive index $\Delta n_{ring} = n_{ring} - n_{cladding}$, and is depicted as a steep step. The ring region 46 is in turn surrounded by the outer cladding region 42.

As discussed above, the steeply stepped ring region 46 is located proximate to the amplitude peaks 32 of the mode intensity profile of the scalar $LP_{11}$ mode 30, shown in FIG. 3. The ring effective refractive index $\Delta n_{ring}$ should have a value that is sufficiently high to cause the desired separation of the propagation constants of the $LP_{11}$ eigenmodes. Generally speaking, $\Delta n_{ring}$ should be 0.015 or greater. In particular, both $n_{ring} - n_{core}$ and $n_{ring} - n_{cladding}$ should each be 0.015 or greater.

Figure 5:
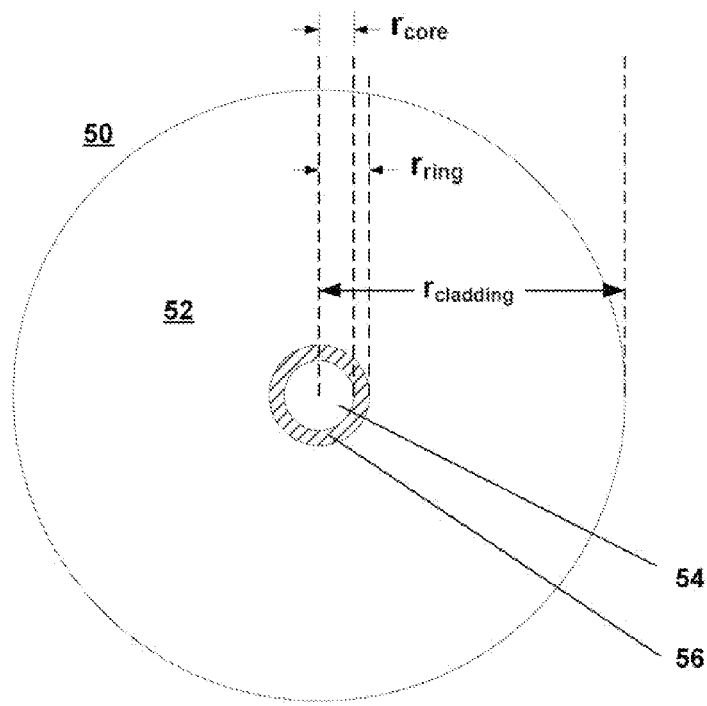
FIG. 5 is a cross section, not drawn to scale, of a fiber manufactured according to the FIG. 4 refractive index profile.

FIG. 5 is a cross section, not drawn to scale, of a fiber 50 manufactured according to the refractive index profile 40 shown in FIG. 4. The fiber includes an outer cladding 52, a core region 54, and a ring region 56. The fiber 50 may be fabricated from $SiO_2$ or other suitable material, using a modified chemical vapor deposition (MCVD) technique, or other suitable technique. The outer cladding region 52 and core region 54 are undoped. The ring region 56 is formed by doping it with a suitable index-raising dopant, or mixture of dopants, such as $GeO_2$, or the like.

Figure 6:
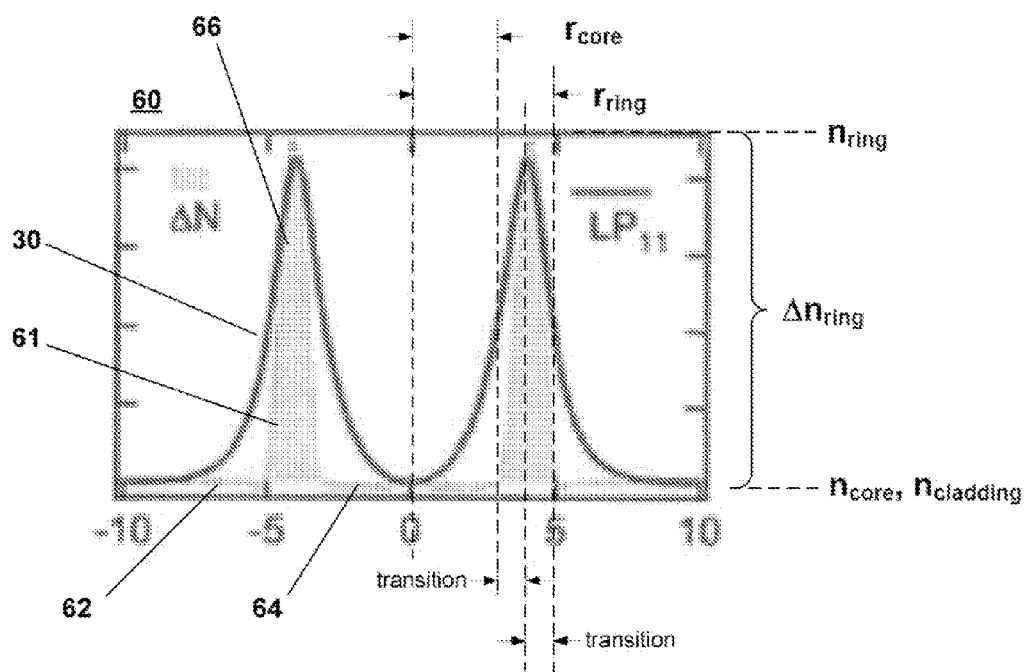
FIG. 6 is a composite profile, in which the FIG. 3 mode intensity profile is superimposed over the actual refractive index profile obtained from a fiber manufactured according to the FIG. 4 refractive index profile.

FIG. 6 shows a composite profile 60, showing the scalar $LP_{11}$ mode intensity profile 30 superimposed over the actual refractive index profile 61 of a fiber manufactured according to the desired refractive index profile 40 shown in FIG. 4. As shown in FIG. 6, the actual refractive index profile 61 includes a substantially flat outer cladding region 62, core region 64, and ring region 66. Of course, in an actual fiber, it is typically not possible to obtain a perfectly square "step" for the ring region 66. However, generally speaking, in order to achieve the desired results, the transition in the ring region from $n_{core}$ to $n_{ring}$ and the transition from $n_{ring}$ to $n_{cladding}$ should each have a radial width of 1 micrometer or less.

Figure 7:
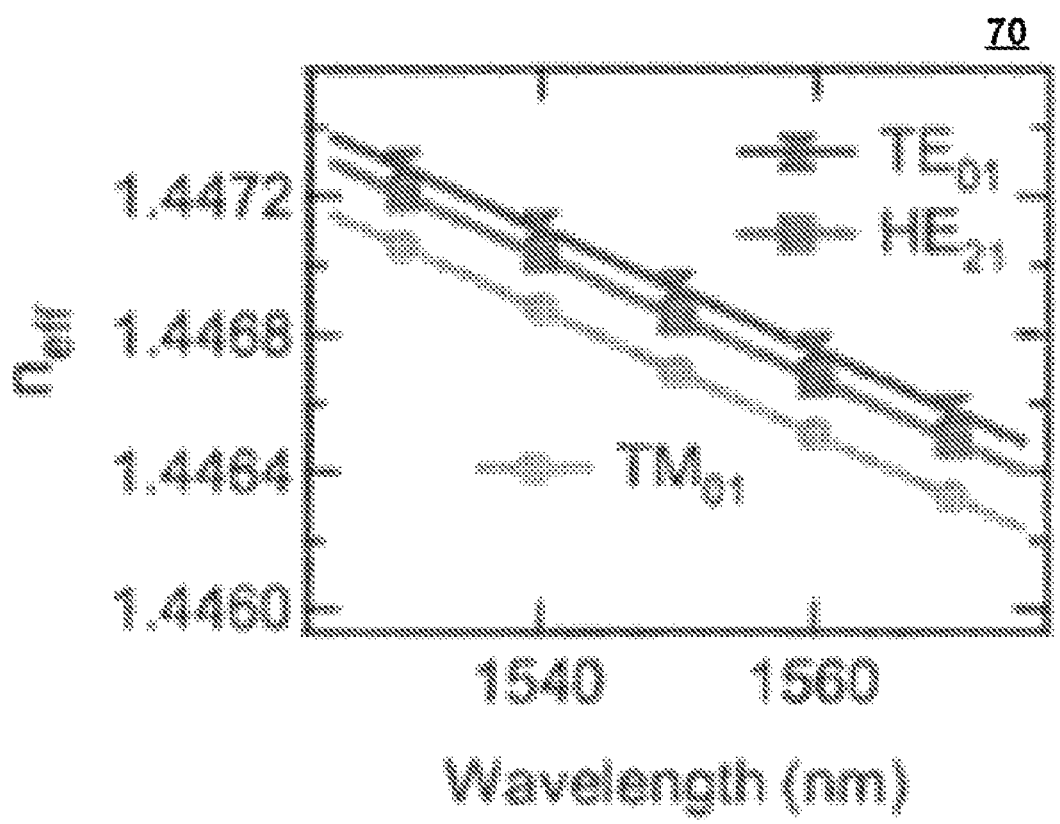
FIG. 7 is a graph in which effective refractive index $n_{eff}$ is plotted against wavelength for the $LP_{11}$ eigenmodes, which have been separated according to the present invention.

FIG. 7 is a graph 70 in which $n_{eff}$ is plotted against wavelength for the vector components $TM_{01}$, $HE_{21 \; (even \; and \; odd)}$, and $TE_{01}$. In conventional fibers, the three curves would be indistinguishable in the scale of the FIG. 7 plot 70. It will be seen that $n_{eff}$ for the radially polarized $TM_{01}$ mode is separated from the other guided modes by approximately $1 \times 10^{-4}$. It should be noted that this separation value is similar to the modal separations achieved in conventional PM fibers.

Figure 8:
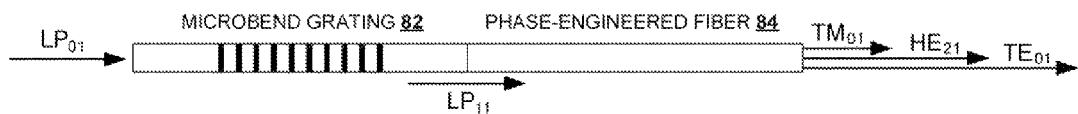
FIGS. 8 and 8A are diagrams of modules for converting a fundamental $LP_{01}$ into a cylindrically polarized beam according to a further aspect of the invention.

The phase-engineered fiber described above can be used to construct an all-fiber module for converting a fundamental $LP_{01}$ mode, which has an approximately Gaussian shape, into a radially polarized mode. FIG. 8 shows a diagram of such a module 80, not drawn to scale, which is constructed by splicing together a microbend grating 82, or other suitable mode converter device, and the described phase-engineered fiber 84. An $LP_{01}$ mode is provided through a suitable fiber, such as a standard single-mode fiber (SMF) not shown, and is provided as an input into the microbend grating 82. The microbend grating 82 then converts the fundamental $LP_{01}$ into the first-higher order $LP_{11}$ mode. The $LP_{11}$ mode is then provided as an input into the phase-engineered fiber 84, which results in the above-described separation of the eigenmodes. A radially polarized beam is obtained by coupling to the $TM_{01}$ mode. An azimuthally polarized beam is obtained by coupling to the $TE_{01}$ mode.

Figure 8A:
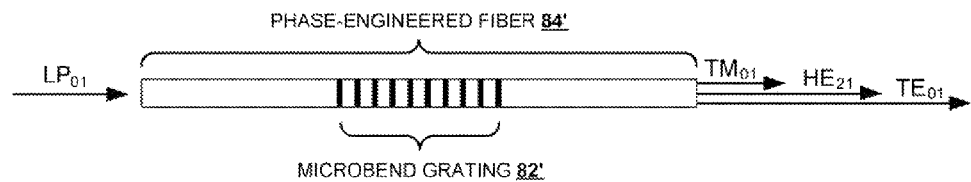

It should be noted that FIG. 8 illustrates a general example, in which the mode-converting fiber 82 is separate from the second fiber 84 that propagates the described mode. According to a further aspect of the invention, illustrated in FIG. 8A, not drawn to scale, a module 80' according to the present invention is constructed by fabricating a grating 82' directly into a portion of phase-engineered fiber 84'.

Figure 9:
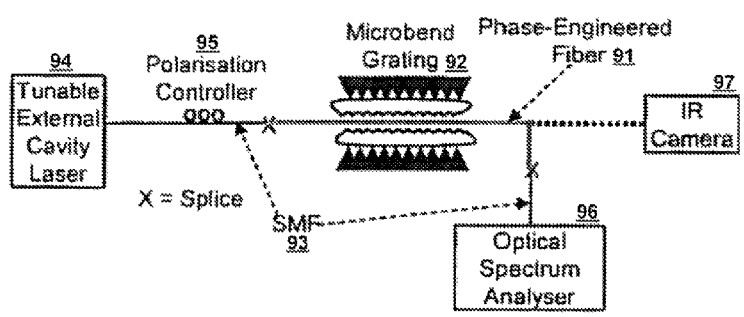
FIG. 9 is a diagram of a setup for testing the polarization characteristics of a phase-engineered fiber according to the invention.

FIG. 9 shows a setup 90 for testing the polarization properties of the described phase-engineered fiber. As shown in FIG. 9, the phase-engineered fiber 91 is spliced to a microbend grating 92. Lengths of single-mode fiber (SMF) 93 are used to connect the fiber 91 and grating 92 to a tunable external cavity laser 94 and polarization controller 95 at the input end, and an optical spectrum analyzer (OSA) 96 at the output end. The test results are recorded using an infrared camera 97.

Figure 10:
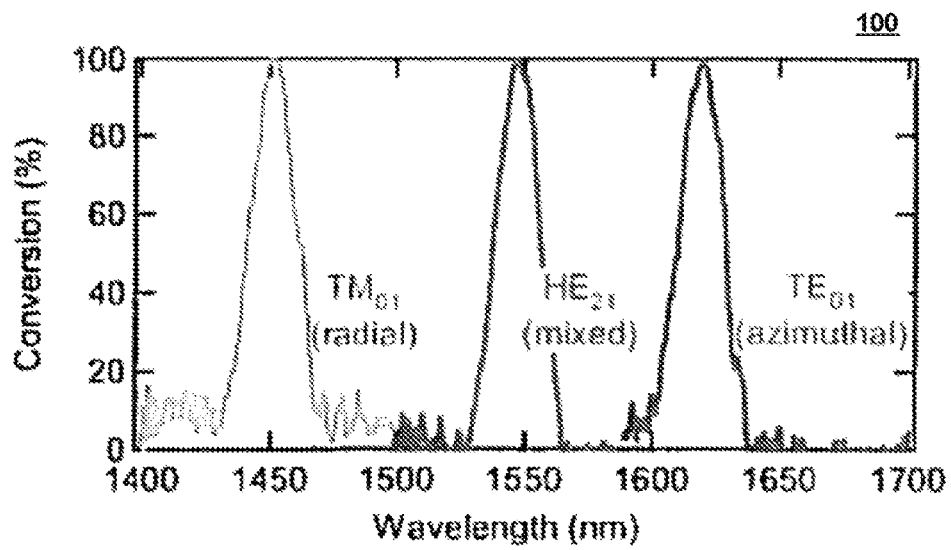
FIG. 10 is a graph in which conversion percentage is plotted against wavelength for the $LP_{11}$ eigenmodes, which have been separated according to the present invention.

FIG. 10 shows an OSA plot 100 where the conversion efficiency percentage is plotted against wavelength. The results of the test showed a conversion efficiency 11 of approximately 99.6%.

Figure 11:
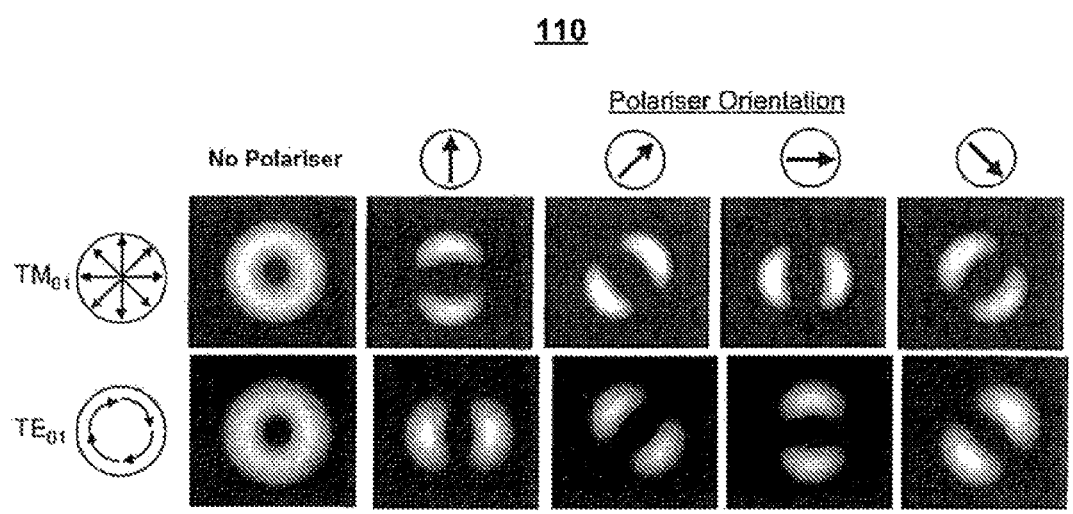
FIG. 11 is a series of near-field images illustrating the results obtained using the FIG. 9 testing setup.

FIG. 11 shows a series of experimentally recorded near-field images 110 yielding a clean annular intensity profile. Image rotation with the polarization controller in the beam path confirms the generation of the radially polarized $TM_{01}$ mode, and the azimuthally polarized $TE_{01}$ mode. Without a polarizer in the beam path, an annular shape is obtained. With the polarizer, only projections that are aligned with the polarizer are transmitted, confirming that clean $TM_{01}$ and $TE_{01}$ modes were generated, rather than a combination of cylindrical vector modes.

FIG. 12 shows a pair of testing setups 120 and 120' further illustrating PM operation using the described fiber. At the heart of setup 120 is a length of the phase-engineered fiber 121. Input and output gratings 122 and 123 enable splicing at the X's to SMFs 124 and 125 at the input and the output so that both ends of the device can be accessed with the $LP_{01}$ mode. The input SMF 124 is connected to an external cavity laser 126, and the output SMF 125 is connected to a commercial polarization analyzer 127. For purposes of comparison, setup 120' includes the elements of setup 120, but which the PM fiber 121 and input and output gratings 122 and 123 have been replaced by a length of SMF 128.

To test its PM capability, the output state of polarization (SOP) was recorded as Poincaré sphere representations 130 and 130' in FIG. 13, while perturbing the fiber. The perturbations 129 and 129' comprise multiple twists and bends with radii-of-curvature $R_c$ down to 1 cm. FIG. 13 shows that while such perturbations fill up to the Poincaré sphere in the case of SMF (sphere 130'), only small changes in the SOP occur with the described fiber (sphere 130). The PER, measured with a rotating polarizer followed by a detector, was 28.7 dB. With the polarizer fixed, there were recorded 0.6 dB power excursions. Assuming the excursions to be due to random coupling in a 2-path interferometer, a mode extinction level of 29.2 dB was calculated—almost identical to the measured PER. While the high level of PER confirms PM operation, these values are not competitive with commercial PM fibers. However, theoretically optimized fiber designs that are conceptually similar show much large $n_{\it eff}$ separations, facilitating the prospect of PER values higher than those of commercial PM fibers.

Figure 14:
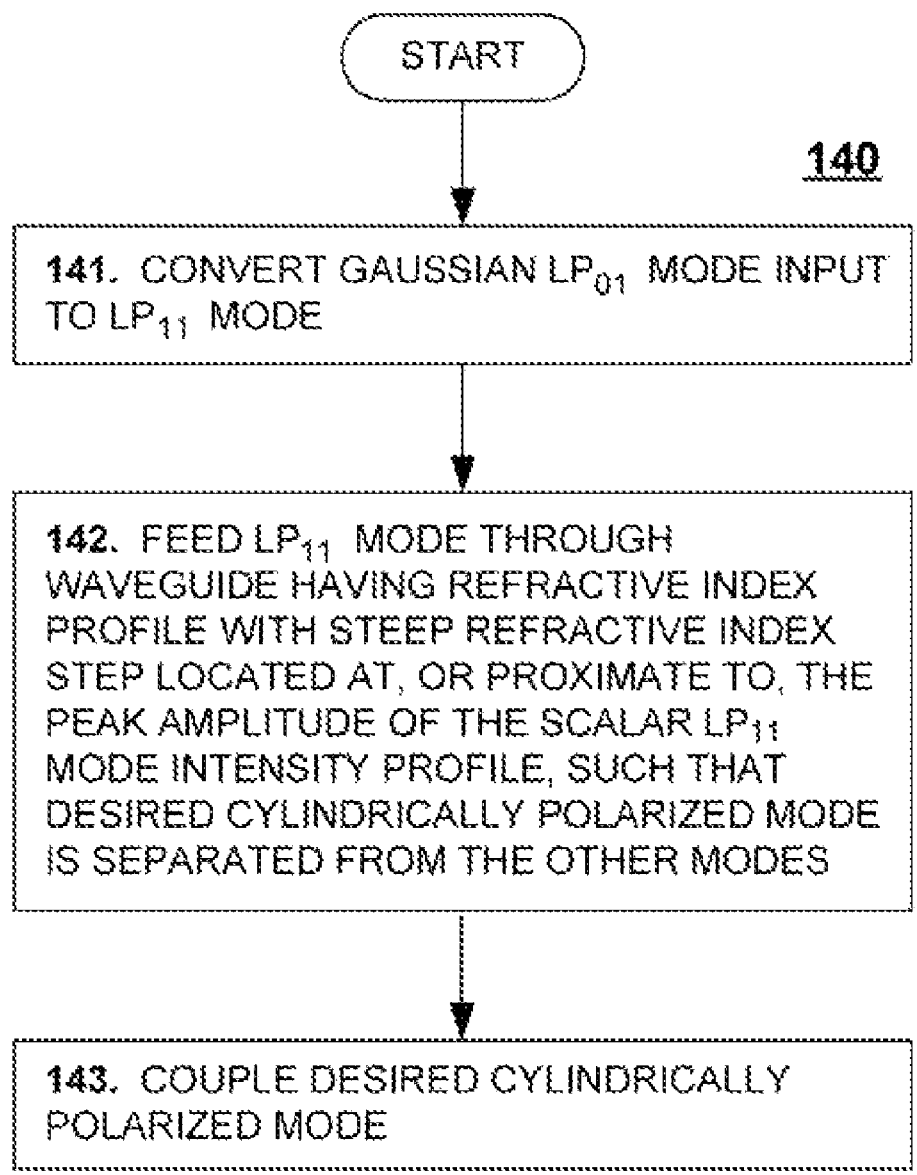
FIG. 14 is a flowchart of an overall technique according to the present invention.

FIG. 14 is a flowchart of an overall technique 140, according to the above-described aspects of the invention, for generally a cylindrically polarized beam. In step 141, a Gaussian $LP_{01}$ mode input is converted to a higher-order $LP_{11}$ mode. In step 142, the $LP_{11}$ mode is fed through a waveguide having a refractive index profile with a steep refractive index step located at, or proximate to, the peak amplitude of the scalar $LP_{11}$ mode intensity profile, such that a desired cylindrically polarized eigenmode, e.g., the $TM_{01}$ mode or the $TE_{01}$ mode, is separated from the other eigenmodes. In step 143, the desired cylindrically polarized eigenmode is coupled to.

In summary, there is described herein what is believed to be the first PM fiber that is strictly circularly symmetric, in geometry and refractive index. These properties could facilitate simple splicing and construction of PM fiber devices, and potentially offer extension ratios higher than conventional PM fibers. One area where it may have significant impact is high-power lasers and amplifiers, since cylindrical vector modes can be much larger in mode area. This fiber is conceptually enabled by a design in which a stable, bend-resistant, and mode-mixing-resistant cylindrical vector beams can be generated. With grating conversion efficiencies of approximately 99.6%, the described technique for generating these modes is an attractive alternative to the significantly more complex free-space systems currently employed. Hence, these devices may also find applications in the diverse areas of science and technology that rely on cylindrical vector beam.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

I claim:

1. A phase-engineered fiber, comprising:
  a core region having a radius $r_{core}$, a refractive index $n_{core}$, and an effective refractive index $\Delta n_{core}$ with respect to an outer cladding region having an outer radius $r_{cladding}$ and a refractive index $n_{cladding}$, where $\Delta n_{core} = n_{core} - n_{cladding}$; and
  a ring region surrounding the core region, the ring region having an inner radius equal to $r_{core}$ and an outer radius $r_{ring}$, a refractive index $n_{ring}$ greater than $n_{cladding}$, and a positive effective refractive index $\Delta n_{ring} = n_{ring} - n_{cladding}$,
  wherein the values of $r_{cladding}$, $r_{core}$, $r_{ring}$, $\Delta n_{core}$, and $\Delta n_{ring}$ cause the fiber to have a refractive index step proximate to a peak amplitude value of a mode intensity profile of a higher-order $LP_{11}$ mode of an optical signal propagating through the fiber,
  wherein the higher-order $LP_{11}$ mode comprises a linear combination of modes, including cylindrically polarized $TM_{01}$ and $TE_{01}$ modes and mixed $HE_{21(even)}$ and $HE_{21(odd)}$ modes,
  wherein the refractive index step is sufficiently steep such that at least one of the cylindrically polarized modes has an effective refractive index sufficiently separated from effective refractive indices of the mixed modes to allow for coupling to the at least one cylindrically polarized mode with minimal coupling to the mixed modes, and
  wherein the fiber further includes a grating fabricated into a portion thereof to provide mode conversion between a fundamental $LP_{01}$ input mode and the higher-order $LP_{11}$ mode.

2. The fiber of claim 1, wherein the effective refractive index of the at least one separated cylindrically polarized mode is separated from the effective refractive indices of the mixed modes by at least a factor of $1 \times 10^{-4}$.

3. The fiber of claim 1, wherein $\Delta n_{core} = 0$.

4. The fiber of claim 1, wherein $n_{ring} - n_{core}$ and $n_{ring} - n_{cladding}$ are each at least approximately 0.015.

5. The fiber of claim 1, wherein:
  transitions between each of $n_{ring}$ and $n_{core}$, and between $n_{core}$ and $n_{cladding}$ have a radial width of at most approximately 1.0 micrometer.

6. The fiber of claim 1, wherein the grating is a microbend grating.

* * * * *